(No Model.)

E. P. WEST.
LEVEL.

No. 559,090. Patented Apr. 28, 1896.

Witnesses:
L. C. Hills
W. S. VanSloan

Inventor:
Elliott P. West,
by Franklin H. Hough
Atty.

United States Patent Office.

ELLIOTT P. WEST, OF ORLANDO, FLORIDA.

LEVEL.

SPECIFICATION forming part of Letters Patent No. 559,090, dated April 28, 1896.

Application filed September 14, 1895. Serial No. 562,513. (No model.)

*To all whom it may concern:*

Be it known that I, ELLIOTT P. WEST, a citizen of the United States, residing at Orlando, in the county of Orange and State of Florida, have invented certain new and useful Improvements in Levels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in levels; and it consists in, first, two levels placed side by side in the same frame, but having their scales placed at an angle to each other, and, second, in a level, two recessed transparent plates placed in a frame, combined with a ball, drop of mercury, or a rolling object of any kind which is placed in the recess between the two plates, which are properly graduated, all of which will be more fully described hereinafter.

The objects of my invention are to combine two levels in the same frame, so that the level can be used either upon its edge or end, according to the space, and to form the recess in which the moving object is placed between two glass plates, so that the object can be seen with the greatest clearness and facility.

Figure 1:
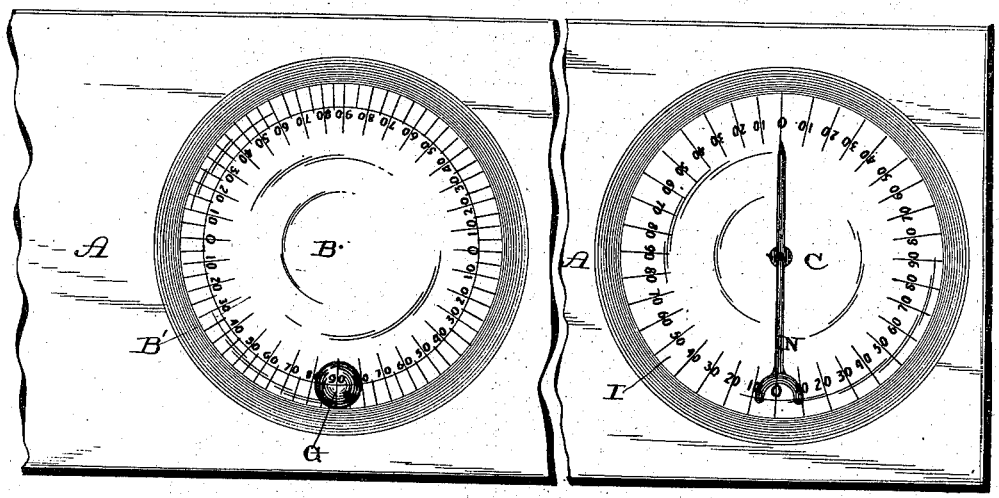
Figure 2:
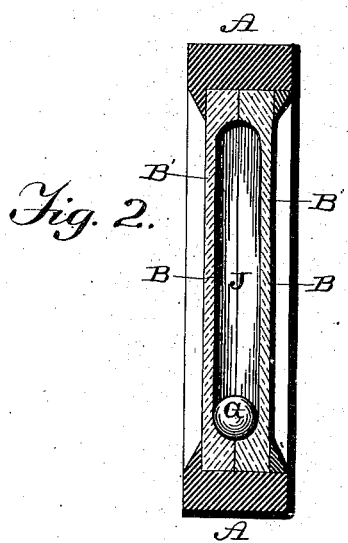

In the accompanying drawings, Figure 1 is a side elevation of a level which embodies my invention. Fig. 2 is a vertical cross-section taken through the two levels shown in Fig. 1.

A represents a suitable frame, which is adapted to be used upon either of its edges or its ends, according to the amount of space in which the level can be applied. In very narrow places the level will be used upon its ends; but where there is plenty of room it will be used upon its edges as a matter of convenience, though it may be used with equal facility in either position.

In order to enable the level to be used in either position, the two levels B C are placed in the same frame; but their scales are placed at right angles to each other, so that while one is adapted to be used when the frame is in a vertical position the other is adapted for use when the frame is in a horizontal one.

While two separate forms of levels are here shown, it is evident that both may be of the same construction. The one B is formed of two circular plates of glass B', both of which have a circular recess formed in their inner sides, and one or both may be provided with a scale which can readily be seen from either side of the frame. When these two pieces of glass are applied edge to edge, as shown in Fig. 2, a circular recess J is formed sufficiently large to receive a ball G, a drop of mercury, or other rolling object, as may be preferred. These two pieces of glass may be cemented together, so as to form an air-tight joint in case a drop of mercury is used, or they may be applied together and secured in position, as shown. The scale of this level is shown as adapted to be used when the frame is stood upon its end; but this scale may be arranged so as to be used when the frame is used upon its edges.

The second level, C, consists of two circular glass plates I, one or both of which are provided with a scale, and both of which have a slight recess or bearing-point J' formed at their center to receive the tapered ends of the pivot-pin L of the weighted marker N. These two plates of glass are placed in circular recesses made in opposite sides of the frame and secured in position by means of the keepers O. The scale is shown as adapted to be used when the frame is used upon either one of its edges.

As stated above, both levels may be formed alike or differently, as here shown, as may be preferred.

Having thus described my invention, I claim—

As an improved article of manufacture, a level having a circular aperture, glass plates B, B, graduated and having their inner faces recessed and circular in outline, the adjacent meeting edges of the said plates held within the level and in contact so that the edges of the recesses will register, combined with a drop of quicksilver or ball adapted to travel in the glass groove thus formed by the said plates, substantially as shown and for the purpose set forth.

In testimony whereof I affix my signature in presence of two witnesses.

ELLIOTT P. WEST.

Witnesses:
    J. G. WELSBY,
    EDWARD JESSUP.